Oct. 18, 1966  C. H. MacFARLAND  3,279,828
COUPLING MEANS
Filed May 14, 1963
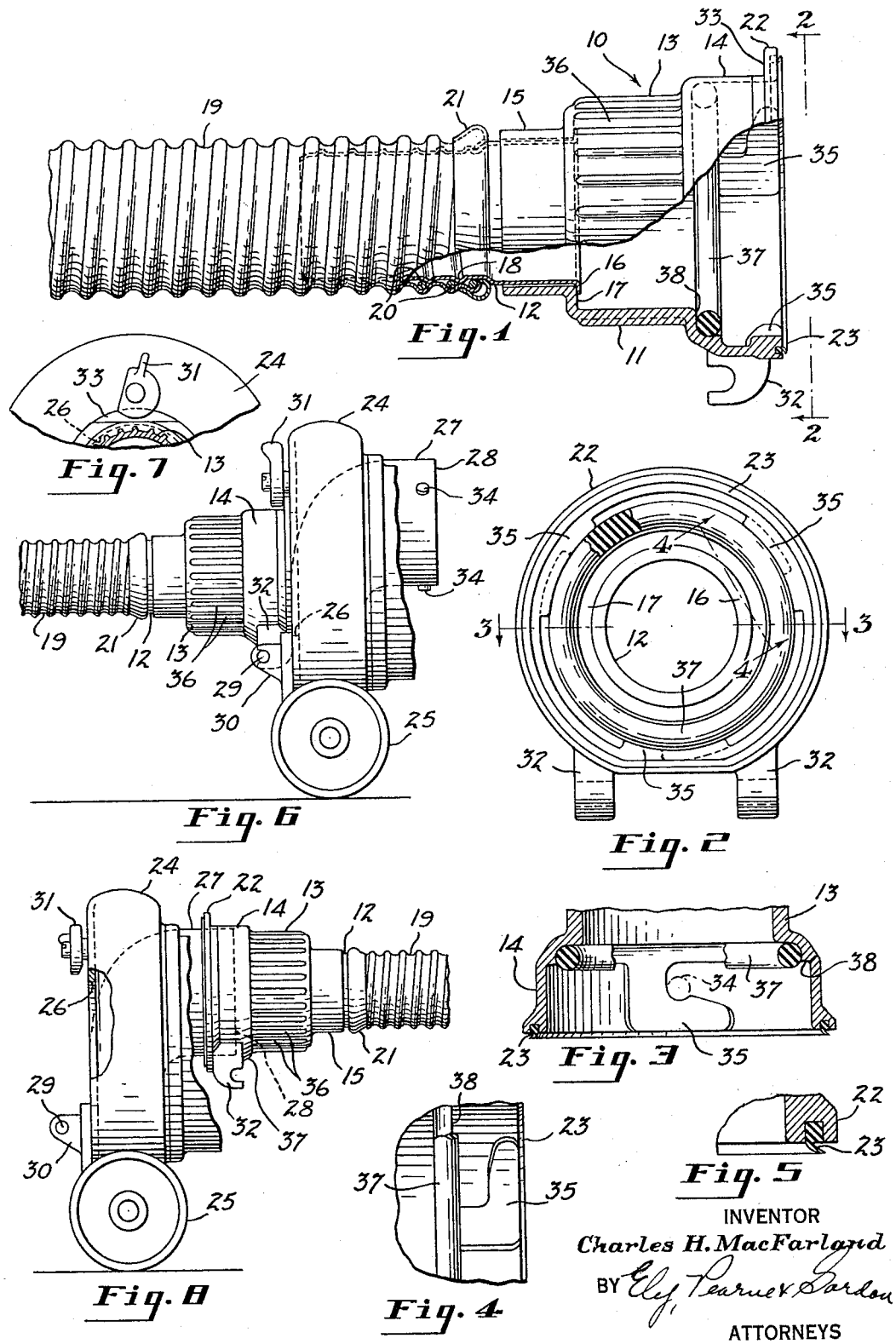
INVENTOR
Charles H. MacFarland
BY
ATTORNEYS United States Patent Office 3,279,828
Patented Oct. 18, 1966

3,279,828
COUPLING MEANS
Charles H. MacFarland, Rocky River, Ohio, assignor to The Scott & Fetzer Company, Cleveland, Ohio, a corporation of Ohio
Filed May 14, 1963, Ser. No. 280,308
4 Claims. (Cl. 285—7)

This invention relates to suction cleaners and, more particularly, to a coupling device for attaching an extension hose for off-the-floor attachments and surface nozzles to a suction cleaner.

Various attachments are in use today as accessory equipment for suction cleaners. These attachments are connected to the blower inlet or outlet or to the blower motor itself, depending upon the function and use of the attachment. The attachments that are connected to the blower inlet or outlet are usually disposed on one end of a flexible hose and the other end of the hose is attached to the blower inlet or outlet by coupling devices. Heretofore, two different types of coupling devices were employed for attaching a flexible hose to the inlet and outlet openings because of structural differences in these openings. Although these prior art coupling devices provided suitable connections between the hose and its opening, the arrangement resulted in the multiplication of parts to perform substantially the same function.

It is, therefore, a general object of this invention to overcome the above problem by providing a single coupling device that may be attached to either a blower inlet or outlet opening.

It is a more specific object of this invention to provide a single coupling device that will attach a flexible hose to either an opening which terminates at a flat wall or an opening which is defined by a thin-walled cylinder.

These and other objects and advantages of the invention will be apparent from the following description and drawings, in which:

FIG. 1 is a side elevation, partly in section, of a coupling device according to this invention;

FIG. 2 is a rear elevation of the coupling device, the plane of the view being indicated by the line 2—2 in FIG. 1;

FIG. 3 is a fragmentary sectional view, the plane of the section being indicated by the line 3—3 in FIG. 2;

FIG. 4 is a fragmentary sectional view, the plane of the section being indicated by the line 4—4 in FIG. 2;

FIG. 5 is an enlarged portion of the device illustrated in FIG. 4;

FIG. 6 is a fragmentary view illustrating the coupling device employed to attach a hose to the inlet opening of a suction cleaner fan case for suction purposes;

FIG. 7 is an enlarged, fragmentary, front elevational view of the assembly shown in FIG. 6; and FIG. 8 is a fragmentary view illustrating the coupling device employed to attach a hose to the outlet opening of a suction cleaner fan case for blowing purposes.

Referring now to FIG. 1, a coupling device 10 is illustrated. The device 10 includes an outer adapter sleeve 11 and an inner adapter sleeve 12. The outer adapter sleeve 11 comprises a cylindrical body portion 13, a relatively large, tubular mouth portion 14, and a relatively small neck portion 15.

The inner sleeve 12 is telescoped within the neck portion 15 and is provided with an annular lip 16 at one end which butts against a shoulder 17 between the portions 13 and 15. The other end of the inner sleeve 12 extends outwardly beyond the neck portion 15 and is provided with annular corrugations 18. A flexible hose 19 is telescoped over the corrugated end of the sleeve 12. The hose 19 includes an inner wire spiral 20 which adds circumferential rigidity to the hose 19 and cooperates with the annular corrugations to lock the hose 19 in place. An annular clip 21 is provided at the juncture between the hose 19 and the sleeve 12 as a means to further detachably lock the hose 19 in place.

The mouth portion 14 is provided with an outwardly extending flange portion 22. An annular groove is provided in this flange portion and receives a sealing ring 23. The sealing ring 23 may be rubber, felt, or other equivalent sealing material.

With reference to FIGS. 6, 7, and 8 of the drawings, a suction cleaner of the so-called horizontal type has been selected for the purpose of illustrating, in conjunction therewith, the coupling device 10. Such a cleaner includes a fan case 24 mounted on suitable wheels 25. The fan case 24 has an inlet or suction opening 26 (FIG. 7) and a thin-walled, cylindrical tube 27 which defines an outlet or blower opening 28. In normal on-the-floor cleaning, the inlet or suction opening 26 has attached thereto a suction nozzle (not shown) which in the illustrated embodiment has been removed so that the opening 26 may receive the coupling device 10.

To connect the hose 19 to the inlet opening 26 of the fan casing 24, the coupling device 10 is attached to the front wall of the fan casing 24 in alignment with the inlet opening 26. For making this attachment, there is mounted on the front wall of the fan casing 24, below the inlet opening 26, a transversely extending retaining bar 29 carried by a pair of spaced lugs 30 (only one of which is illustrated) and above the opening 26, a rotatable locking nut 31. The retaining bar 29 and locking nut 31 cooperate with spaced depending lugs 32 and a flattened portion 33 of the flange 22, respectively, provided on the mouth portion 14 for maintaining the same in operative position on the front face of the fan chamber 24. With the coupling device 10 positioned and locked in this manner, the sealing ring 23 cooperates with the front face of the fan casing 24 to provide an airtight seal around the opening 26.

To connect the hose 19 to the outlet opening 28 of the fan casing 24, the mouth portion 14 of the coupling device 10 is telescoped over the thin-walled tube 27. For making this attachment a plurality of radially extending pins 34 are circumferentially spaced around the outside surface of the tube 27 near the opening 28. The pins 34 cooperate with spaced, inwardly extending cam elements 35 which are provided on the inside surface of the mouth portion 14. The cam elements 35 has a thickness which is only slightly greater than the radial length of the pins 34 and an inside diameter which is only slightly greater than the outside diameter of the tube 27 so that a tight friction fit is established between the tube 27 and the mouth portion. The connection is accomplished by telescoping the mouth portion 14 over the tube 27 and turning the coupling device in a clockwise direction until the pins 34 are firmly gripped by the cam elements 35. As an aid in this turning operation, a multiplicity of ribs 36 may be provided on the surface of the body portion 13. With the coupling device 10 positioned and locked in this manner, the end of the tube 27 butts against a sealing ring or gasket 37 which is provided in a shoulder 38 between the mouth portion 14 and the body portion 13 to establish an airtight seal around the opening 28.

The scope of the invention is not limited to the slavish imitation of all the structural and operative details mentioned above. These have been given merely by way of an example of a presently preferred embodiment of the invention.

What is claimed is:

1. A coupling device for attaching a hose alternately to a blower inlet opening defined by a flat wall and a blower outlet opening defined by a cylindrical wall, comprising a cylindrical sleeve, a hose fixed to one end of said sleeve, means on the outer surface of the other end of said sleeve for locking the sleeve to the flat wall when the sleeve is positioned over said blower inlet opening to thereby lock the sleeve over the inlet opening, sealing means on said sleeve to provide an airtight seal between said sleeve and said flat wall and around the inlet opening when the sleeve is in its locked position with respect to the inlet opening, means within said sleeve engageable with locking means on the outer surface of the cylindrical wall when the sleeve is telescoped over said cylindrical wall to thereby lock said sleeve over said outlet opening, and sealing means within said sleeve to provide an airtight seal between said sleeve and said cylindrical wall and around said outlet opening when the coupling device is in its locked position with respect to the outlet opening.

2. A coupling device for attaching a hose alternately to a blower inlet opening defined by a flat wall and a blower outlet opening defined by a cylindrical wall, comprising a cylindrical sleeve having a mouth portion and a neck portion, a hose connected to said neck portion, means on the outer surface of said mouth portion for locking the coupling device to the flat wall when the mouth portion is positioned over said blower inlet opening to thereby lock said coupling device over said inlet opening, sealing means on said mouth portion to provide an airtight seal between said coupling device and said flat wall and around the inlet opening when the coupling device is in its locked position with respect to the inlet opening, means within said mouth portion engageable with locking means on the outer surface of the cylindrical wall when the mouth portion is telescoped over said cylindrical wall to thereby lock said coupling device over said outlet opening, and sealing means within said mouth portion to provide an airtight seal between said coupling device and said cylindrical wall and around said outlet opening when the coupling device is in its locked position with respect to the outlet opening.

3. A coupling device for attaching a hose alternately to a blower inlet opening defined by a flat wall and a blower outlet opening defined by a cylindrical wall, comprising an outer sleeve having a mouth portion and a neck portion, an inner sleeve telescoped within said neck portion and extending beyond said outer sleeve, a hose connected to said inner sleeve, said mouth portion having lugs on its outer surface engageable with locking means on the flat wall when the mouth portion is positioned over said blower inlet opening to thereby lock said coupling device over said inlet opening, said mouth portion having cam elements on its inner surface engageable with locking means on the outer surface of the cylindrical wall when the mouth portion is telescoped over said cylindrical wall to thereby lock said coupling device over said outlet opening.

4. A coupling device for attaching a hose alternately to a blower inlet opening defined by a flat wall and a blower outlet opening defined by a cylindrical wall, comprising an outer sleeve having a mouth portion and a neck portion, an inner sleeve telescoped within said neck portion and extending beyond said outer sleeve, a hose connected to said inner sleeve, said mouth portion having lugs on its outer surface engageable with locking means on the flat wall when the mouth portion is positioned over said blower inlet opening to thereby lock said coupling device over said inlet opening, a first sealing ring on said mouth portion to provide an airtight seal between said coupling device and said flat wall and around the inlet opening when the coupling device is in its locked position with respect to the inlet opening, said mouth portion having cam elements on its inner surface engageable with locking means on the outer surface of the cylindrical wall when the mouth portion is telescoped over said cylindrical wall to thereby lock said coupling device over said outlet opening, and a second sealing ring within said mouth portion to provide an airtight seal between said coupling device and said cylindrical wall and around said outlet opening when the coupling device is in its locked position with respect to the outlet opening.

References Cited by the Examiner
UNITED STATES PATENTS

| 1,187,321 | 6/1916 | Hubbard | 285—176 |
| 1,540,906 | 6/1925 | Schweinert | 285—12 |
| 1,919,001 | 7/1933 | White | 285—361 |
| 2,122,633 | 7/1938 | Baxter | 285—7 |
| 2,252,132 | 8/1941 | Mazueskas | 285—402 |
| 2,280,350 | 4/1942 | Pardee | 285—395 X |
| 2,450,544 | 10/1948 | Foley | 285—7 |
| 2,382,348 | 8/1945 | Taylor | 285—402 |

FOREIGN PATENTS

| 684,258 | 11/1939 | Germany. |

CARL W. TOMLIN, *Primary Examiner.*

R. GIANGIORGI, *Assistant Examiner.*